(12) United States Patent
Buell et al.

(10) Patent No.: US 6,672,419 B2
(45) Date of Patent: Jan. 6, 2004

(54) MOTORCYCLE FRONT BRAKE ROTOR MOUNTING

(75) Inventors: Erik F. Buell, Mukwonago, WI (US); Julian A. Galgoczy, N. Kingstown, RI (US); Abraham Askenazi, Burlington, WI (US)

(73) Assignee: Buell Motorcycle Company, East Troy, WI (US)

( * ) Notice: Subject to any disclaimer, the term of this patent is extended or adjusted under 35 U.S.C. 154(b) by 0 days.

(21) Appl. No.: 10/395,518

(22) Filed: Mar. 23, 2003

(65) Prior Publication Data

US 2003/0188907 A1 Oct. 9, 2003

Related U.S. Application Data

(63) Continuation of application No. 09/901,494, filed on Jul. 9, 2001, now Pat. No. 6,561,298.

(51) Int. Cl.⁷ .............................................. F16D 65/12
(52) U.S. Cl. .................. 180/221; 188/218 A; 188/72.3
(58) Field of Search ................................. 180/219, 221; 188/18 A, 218 XL, 218 A, 73.38, 72.3; 403/29, 30; 192/70.17, 70.28

(56) References Cited

U.S. PATENT DOCUMENTS

| | | | |
|---|---|---|---|
| 3,692,150 A | 9/1972 | Ruppe, Jr. | |
| 3,709,561 A | 1/1973 | De Biasse et al. | |
| 3,927,740 A | 12/1975 | Zarembka | |
| 4,007,814 A | * 2/1977 | Berger | 188/218 XL |
| 4,488,761 A | 12/1984 | Buell | |
| 4,511,021 A | * 4/1985 | Grider | 188/218 XL |
| 4,548,306 A | * 10/1985 | Hartz | 192/70.28 |
| 4,557,356 A | * 12/1985 | Petersen | 188/218 XL |
| 4,641,731 A | 2/1987 | Kawaguchi et al. | |
| 4,660,683 A | 4/1987 | Hayashi et al. | |
| 4,662,482 A | 5/1987 | Bass | |
| 4,716,993 A | 1/1988 | Bass | |
| 4,784,246 A | 11/1988 | Edmisten | |
| 4,863,001 A | * 9/1989 | Edmisten | 188/218 XL |
| 5,492,205 A | 2/1996 | Zhang | |
| 5,560,452 A | 10/1996 | Labougle | |
| 5,697,473 A | * 12/1997 | Lindner | 188/72.3 |
| 5,732,798 A | 3/1998 | Toson | |
| 6,308,807 B1 | * 10/2001 | Matsumoto et al. | 188/72.4 |

* cited by examiner

Primary Examiner—Lesley D. Morris
Assistant Examiner—Tony Winner
(74) Attorney, Agent, or Firm—Michael Best & Friedrich LLP

(57) ABSTRACT

The present invention provides a motorcycle that includes a frame, a wheel mounted to the frame for rotation with respect to the frame, a rotor mounted to the wheel, and a caliper selectively clamping the rotor to slow down the rotation of the wheel. A biasing member is provided between the rotor and the wheel and is offset from a fastener. The biasing member biases the rotor against the head of the fastener.

12 Claims, 4 Drawing Sheets

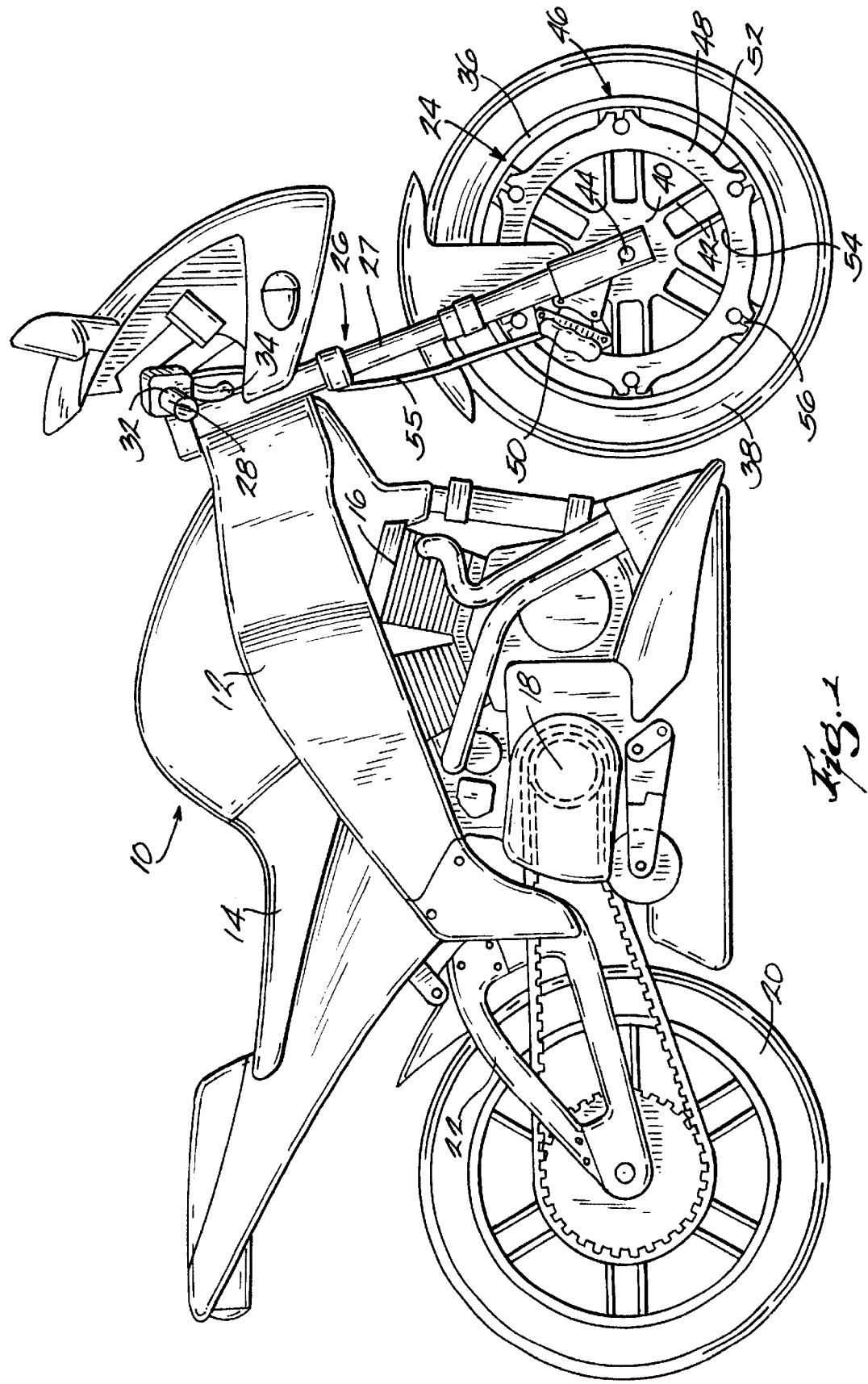

MOTORCYCLE FRONT BRAKE ROTOR MOUNTING

CROSS-REFERENCE TO RELATED APPLICATIONS

This application is a continuation of U.S. application Ser. No. 09/901,494, filed Jul. 9, 2001, now U.S. Pat. No. 6,561,298 the entire content of which is herein incorporated by reference.

BACKGROUND

The invention relates to motorcycle braking assemblies, and more particularly to brake rotor mounting assemblies.

It is known to use disc brakes on a motorcycle. Disc brake assemblies include a disc or rotor mounted to a wheel, and a caliper positioned next to the rotor and capable of clamping onto the rotor to slow down the rotation of the associated wheel. Known motorcycle disc brake assemblies fall roughly into two categories. The first category includes a rotor mounted at the hub of the wheel and a caliper clamping the radially outer edge of the rotor. This is the most common type of disc brake assembly used on existing cars and motorcycles.

The second category, a so-called "inside-out" assembly, includes a ring-shaped rotor mounted to the wheel along the rotor's radially outer edge, and a caliper clamping the radially inner edge of the rotor. During braking, a rotor can become very hot due to the friction between the caliper and the rotor. It is known to mount inside-out rotors in a way that permits radial thermal expansion of the rotor during braking.

SUMMARY

The present invention provides a motorcycle that includes a frame, a wheel mounted to the frame for rotation with respect to the frame, a rotor mounted to the wheel, and a caliper selectively clamping the rotor to slow down the rotation of the wheel. A biasing member is provided between the rotor and the wheel and is offset from a fastener. The biasing member biases the rotor against the head of the fastener.

Other features and advantages of the invention will become apparent to those skilled in the art upon review of the following detailed description, claims, and drawings.

BRIEF DESCRIPTION OF THE DRAWINGS

FIG. 2 is an enlarged side view of the font wheel of the motorcycle of FIG. 1.

Figure 1:
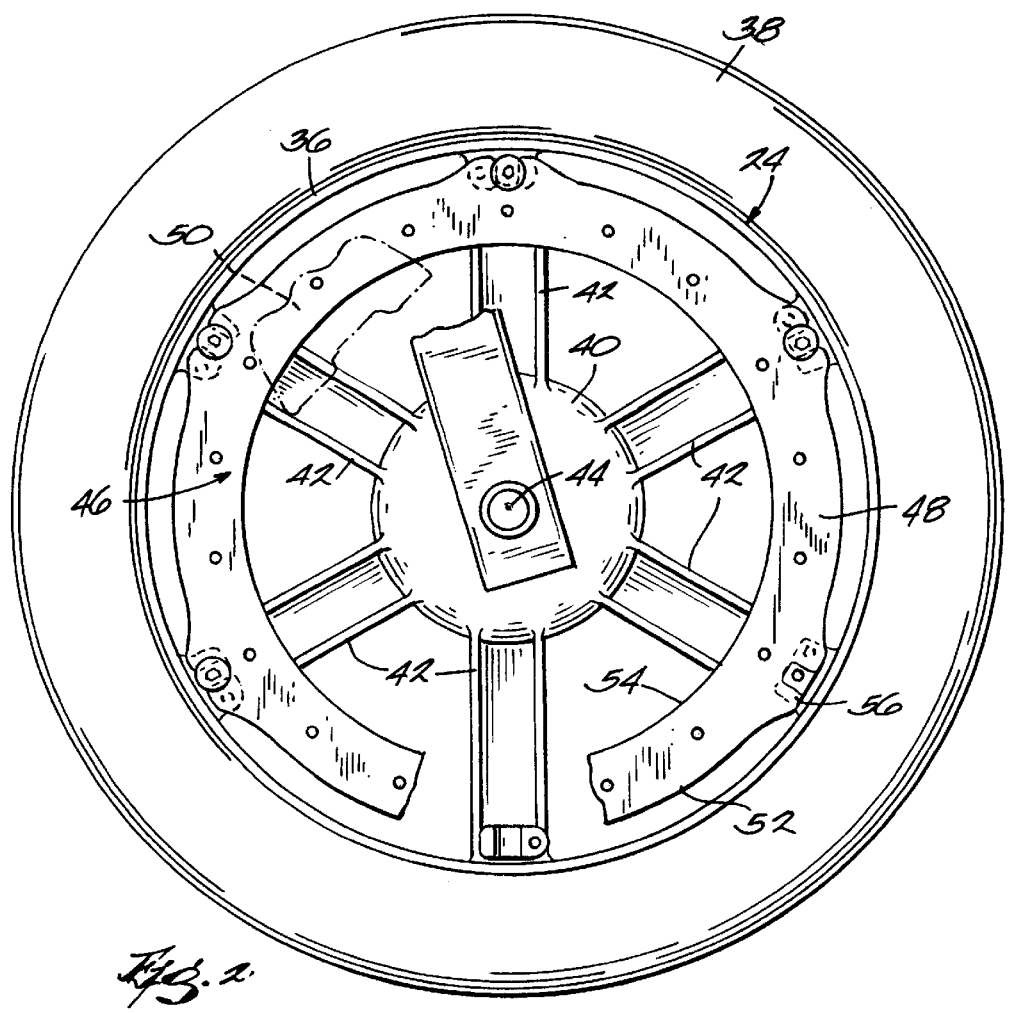
FIG. 1 is a side view of a motorcycle embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

FIG. 1 illustrates a motorcycle 10 having a frame 12 and a seat 14, engine 16, and transmission 18 all supported by the frame 12. A rear wheel 20 is interconnected to the frame 12 with a swingarm 22, and a front wheel 24 is interconnected to the frame 12 with a steering assembly 26 including a front fork 27 and handlebars 28. Mounted to the handlebars 28 is the motorcycle control system, including a throttle 32 and a brake handle 34.

FIG. 2 is an enlarged side view of the front wheel 24 of the motorcycle 10. The front wheel 24 includes a rim 36, a tire 38 mounted to the rim 36, a hub 40, and a plurality of spokes 42 extending in a radial direction from the hub 40 to the rim 36. The front wheel 24 is mounted to the steering assembly 26 for rotation about a rotational axis 44.

An inside-out disc braking assembly 46 is mounted to the motorcycle 10 and includes a brake rotor 48 mounted to the front wheel 24 and a caliper 50 mounted to the front fork 27. A similar disc braking assembly 46 may also be provided on the rear wheel 20, or a hub-mounted rotor may be employed on the rear wheel 20. The rotor 48 is generally ring-shaped, and has a center axis, an outer edge 52, and an inner edge 54. The rotor 48 is mounted to the front wheel 24 such that the center axis is collinear with the rotational axis 44 of the front wheel 24. The rotor 48 is mounted to the rim 36 as will be described below in more detail, but could alternatively be mounted to the plurality of spokes 42 in a similar fashion.

The caliper 50 is positioned proximate to the inner edge 54 of the rotor 48. A brake cable 55 interconnects the caliper 50 and one of the brake handles 34 such that the caliper 50 selectively clamps onto the rotor 48 in response to actuation of the brake handle 34. Once clamped onto the rotor 48, the caliper 50 causes the rotor 48, and consequently the front wheel 24, to slow down due to the frictional engagement between the caliper 50 and the rotor 48.

Figure 3:
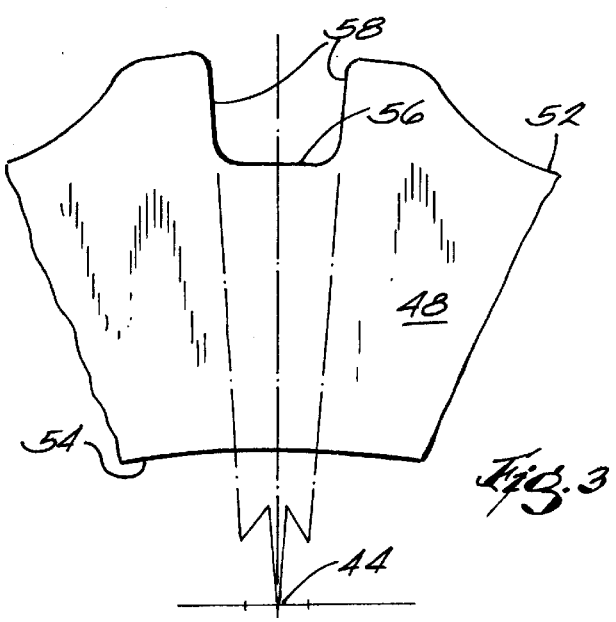
FIG. 3 is an enlarged side view of a slot in the front brake rotor of the motorcycle of FIG. 1.
Figure 4:
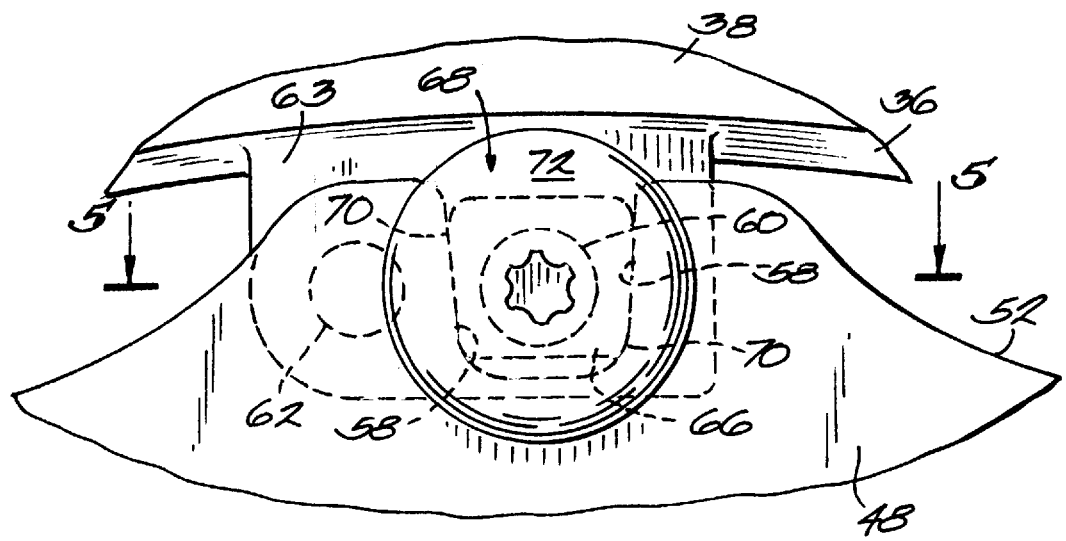
FIG. 4 is an enlarged side view of a portion of the front brake rotor and wheel.

Turning now to FIGS. 3 and 4, the rotor 48 includes a plurality of slots 56 along its outer edge 52. The illustrated slots 56 are open-ended, but may alternatively be close-ended slots. Each slot 56 includes a pair of flat edges 58 that are non-parallel to each other. The flat edges 58 preferably define lines that extend in the radial direction and converge at the hub 40 on the axis of rotation 44 of the wheel 24.

Figure 5:
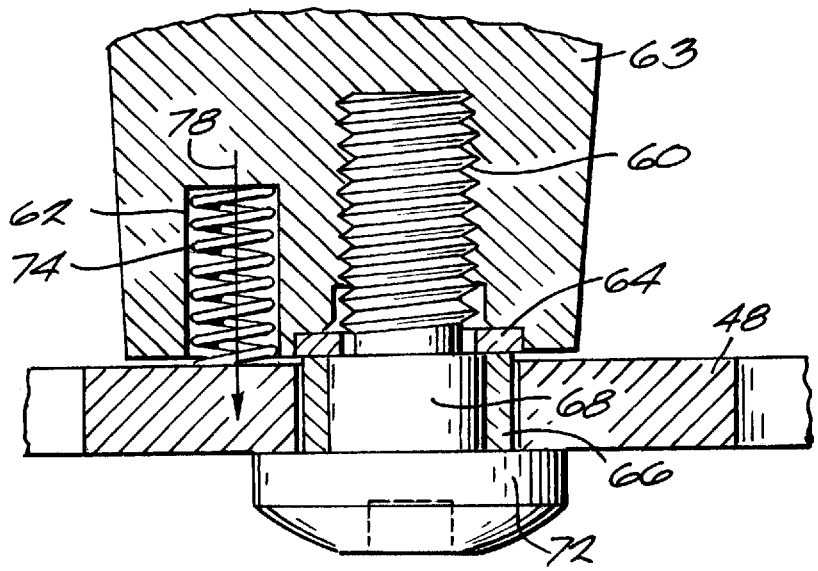
FIG. 5 is a cross-section view taken along line 5—5 in FIG. 4.
Figure 6:
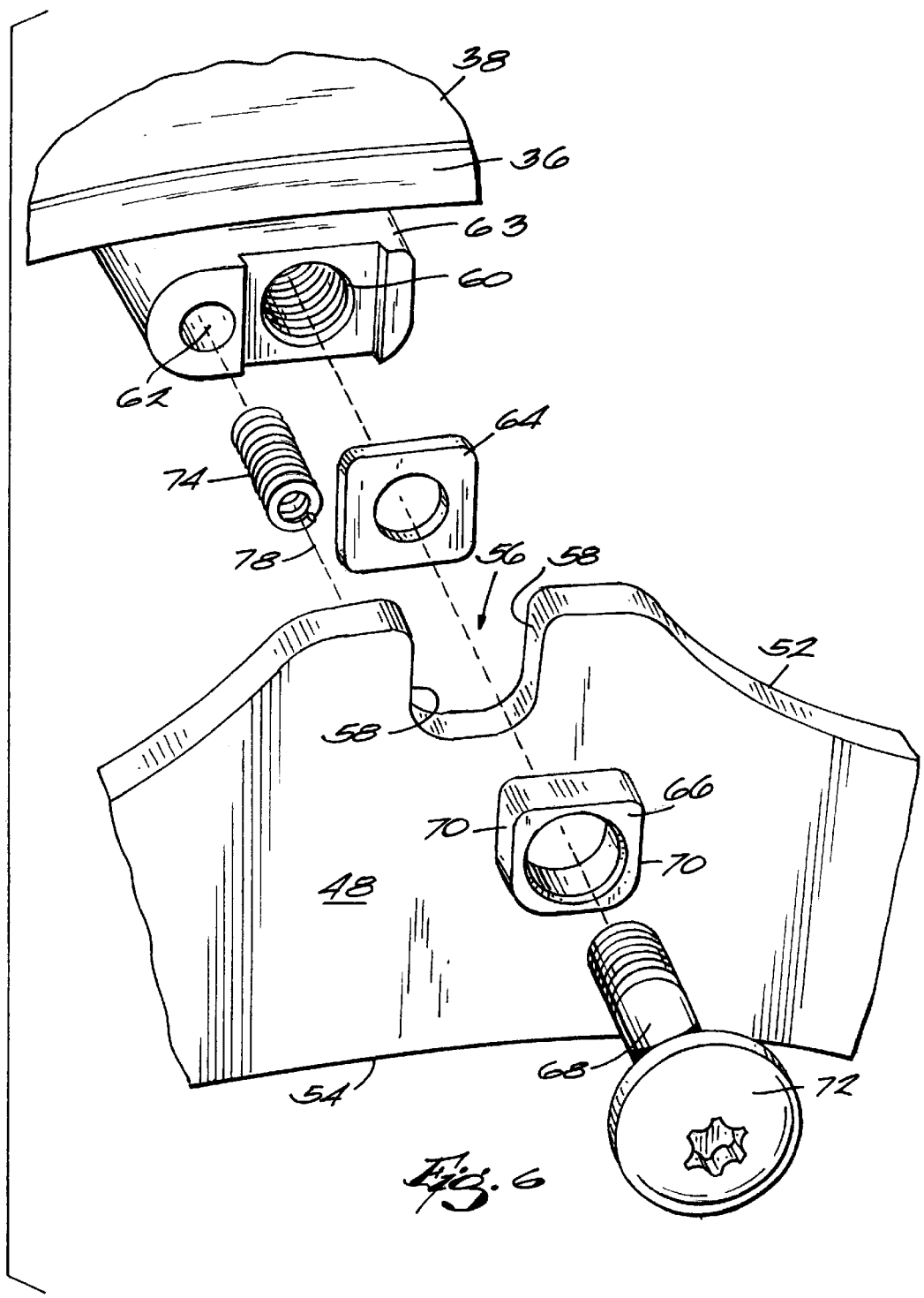
FIG. 6 is an enlarged exploded view of a portion of the front brake assembly of the motorcycle of FIG. 1.

Turning to FIGS. 5 and 6, a threaded bore 60 and a smooth blind bore 62 are provided in a boss 63 extending away from the radially inward face of the rim 36, or alternatively from a spoke 42 of the wheel 24. The rotor 48 is mounted to the wheel 24 by way of a washer 64, a spacer 66 and a fastener 68. The spacer 66 includes flat sides 70 that are non-parallel and is shaped to fit snugly into the slot 56 in the rotor 48 such that there is contact between the flat sides 70, 58 of the spacer 66 and the slot 56 substantially along the entire length of the spacer 66. In alternative embodiments, the washer 64 and the spacer 66 may be integrally-formed with the boss 63 and wheel 24. The washer 64 and spacer 66 include through-bores that permit the fastener 68 to extend through the spacer 66 and the washer 64 and thread into the threaded bore 60 in the wheel 24. The fastener 68 includes a head 72 having a diameter larger than the width of the slot 56 and spacer 66 such that the head 72 extends beyond the sides of the spacer 66.

A biasing member, such as the illustrated coil spring 74, is inserted into the blind bore 62 in the boss 63 and is compressed between the boss 63 and the rotor 48. The spring 74 thus biases the rotor 48 away from the wheel 24 and against the head 72 of the fastener 68. The spring 74 provides a resilient suspension system for the rotor 48 that gives the rotor 48 some play, but reduces noise caused by the rotor 48 bouncing between the fastener head 72 and the wheel 24. In the illustrated embodiment, the spring 74 acts along a line of force 78 that is generally parallel to, and spaced from, the longitudinal axis of the fastener 68. In this regard, the spring 74 is offset from the fastener 68.

In operation, the non-parallel, radially-directed flat sides 58, 70 of the slot and spacer 56, 66 are in contact when the rotor 48 is cool. When the brake handles 34 are actuated, the calipers 50 pinch the rotor 48. Friction between the caliper 50 and the rotor 48 causes the rotor 48 to heat up. The rotor 48 thermally expands in the radial direction under the thermal load. As used herein, "radial direction" means the line perpendicular to the axis of rotation 44 of the wheel 24. Because the flat sides 58, 70 of the slot and spacer 56, 66 are radially-directed, the flat sides 58, 70 remain in substantially full contact with each other even as the rotor 48 thermally expands in the radial direction, and are substantially unaffected by the thermal expansion.

What is claimed is:

1. A motorcycle comprising:

a frame;

a wheel interconnected with the frame for rotation with respect to the frame;

a rotor mounted to the wheel;

a fastener having a longitudinal axis, the fastener securing the rotor to the wheel;

a biasing member compressed between the rotor and the wheel, and biasing the rotor away from the wheel and acting along a line of force that is generally parallel to and non-collinear with the longitudinal axis of the fastener; and a caliper selectively clamping onto a portion of the rotor to slow rotation of the rotor and the wheel.

2. The motorcycle of claim 1, further comprising a bore in the wheel receiving a portion of the biasing member.

3. The motorcycle of claim 1, wherein the biasing member includes a coil spring.

4. The motorcycle of claim 1, wherein the wheel is interconnected with the frame for rotation about an axis of rotation, wherein the rotor includes a slot having flat sides that are non-parallel with respect to each other, and wherein the fastener is positioned in the slot.

5. The motorcycle of claim 4, wherein the slot is open-ended.

6. The motorcycle of claim 4, further comprising a spacer positioned within the slot, wherein the spacer maintains substantially continuous contact with the flat sides of the slot during thermal expansion of the rotor.

7. The motorcycle of claim 6, wherein the spacer includes two flat sides that are non-parallel with respect to each other such that the spacer fits within the slot with each flat side of the spacer extending along and parallel to a respective one of the flat sides of the slot, wherein the flat sides of the spacer maintain substantially continuous contact with the flat sides of the slot along substantially the entire flat sides of the spacer during thermal expansion of the rotor.

8. The motorcycle of claim 6, wherein the fastener extends through the spacer, the fastener including a head capturing the rotor between the head and the wheel.

9. The motorcycle of claim 6, wherein the spacer is separable from the wheel.

10. The motorcycle of claim 4, wherein the flat sides of the slot define lines that converge on the axis of rotation.

11. The motorcycle of claim 1, wherein the wheel includes a rim having a radially inward face, and wherein the rotor is mounted to the radially inward face of the rim.

12. The motorcycle of claim 1, wherein the rotor is ring-shaped and has an inner edge, and wherein the caliper is operable to selectively clamp onto the inner edge of the rotor.

* * * * *